US006543808B1

(12) United States Patent
Mitchell, Jr. et al.

(10) Patent No.: US 6,543,808 B1
(45) Date of Patent: Apr. 8, 2003

(54) DIRECT THERMAL PRINTABLE PULL TABS

(75) Inventors: Chauncey T. Mitchell, Jr., Lakeland, TN (US); Daniel R. Fulwiler, Algoma, WI (US)

(73) Assignee: Translucent Technologies, LLC, Algoma, WI (US)

(*) Notice: Subject to any disclaimer, the term of this patent is extended or adjusted under 35 U.S.C. 154(b) by 26 days.

(21) Appl. No.: 09/899,313

(22) Filed: Jul. 5, 2001

(51) Int. Cl.[7] .................................................. G09B 19/00

(52) U.S. Cl. ........................... 283/49; 283/95; 283/903; 503/208

(58) Field of Search ................................ 283/107, 108, 283/95, 903, 49, 114, 100, 105, 901; 503/201, 200, 208, 226; 273/138.1

(56) References Cited

U.S. PATENT DOCUMENTS 5,416,058 A * 5/1995 Uyttendaele et al. ....... 503/202
5,527,757 A * 6/1996 Uttyendaele et al. ....... 503/201
6,124,236 A * 9/2000 Mitchell, Jr. ................ 503/201

OTHER PUBLICATIONS

"Pull–Tab Dispensers Entice Customers", S. Frankl, Gaming Products & Services, Feb. 2001, pp. 18–21.

* cited by examiner

*Primary Examiner*—Willmon Fridie, Jr.
(74) *Attorney, Agent, or Firm*—Eugene Stephens & Associates; Thomas B. Ryan

(57) ABSTRACT

An improved construction for pull-tab game pieces involves the use or two or more substrates, one of which is at least partially transparent. A thermosensitive imaging layer within which game results are direct thermally printed is located between the transparent substrate and an opaque cover layer through which the game results are printed. An opaque substrate precut to form one or more tabs covers the opposite side of the transparent substrate. The game results are revealed by retracting the tabs to view the game results through the transparent substrate.

38 Claims, 3 Drawing Sheets

DIRECT THERMAL PRINTABLE PULL TABS

TECHNICAL FIELD

Pull tabs, as they are known in the gaming industry, are generally color printed and assembled prior to being loaded into dispensing machines. Improved results are obtained in accordance with this invention by using direct thermal print technology to print game results at point of sale or distribution.

BACKGROUND

Many states sanction games of chance involving preprinted game pieces that can be pulled apart to determine any winnings. The game pieces, which are referred to as "pull tabs", generally contain two layers of paper. The game results are printed on a base layer and are temporarily obscured by a cover layer. Perforations in the cover layer form removable tabs, which can be peeled away to reveal the game results through so-formed windows in the cover layer.

Ordinarily, the pull-tab game pieces are manufactured along high-speed in-line presses. In-line printing is applied to both the base layer and the cover layer to provide information and images for promoting and playing the game. A front face of the base layer generally contains promotional and instructional information concerning game play. A back face of the base layer contains the game results. Digital printing technology is used for serialization and for in-line printing of the results. Less expensive rotary transfer printing technologies are used for repeating patterns. The base layer and the cover layer are laminated together, and perforations are cut through the cover layer to form the tabs that can be peeled back to reveal the game results.

The preprinted game pieces require odds, prizes, and other details of game play and promotion be determined well in advance of play. This limits possibilities for user interaction with game-piece dispensing machines. Any desired change in the ticket price, level of risk, or rules of play requires different pre-printed game pieces. Sometimes, both the number and amounts of the winnings are known for prepackaged sets of game pieces. Early winnings can discourage further sales, because the remaining prizes are known to be diminished.

In addition, the preprinted game pieces require a high standard of security to prevent winning game pieces from being discovered prior to sale. For example, the results must remain hidden from sight by being completely obscured between two substrates. Any tampering of the substrates must be clearly evident. Control over the handling, packaging, and distribution of the pull-tab game pieces is required to guard against more sophisticated breeches of security.

Similar types of games have been developed for play on machines that print the game results locally prior to dispensing the game pieces. The game pieces are printed and dispensed on demand. Odds tables are stored within the machines, allowing for the calculation of odds and scale of winnings for different games and game piece prices. The results of any particular play are not known until the purchased game pieces are printed and dispensed.

Locally printed game pieces are provided in the same basic format, but the base layer is made with micro-encapsulated ink, which is often referred to as "carbonless paper". An impact printer used without a ribbon forms images in the base layer through the cover layer. The pattern of impacts is apparent in the cover layer, which can detract from the anticipatory nature of the game by revealing the results before the game piece is opened.

However, the results are not known prior to the impact printing of the game piece, so the integrity of the game itself to fairly return results is not affected. The security requirements of pull-tab game pieces for protecting results prior to opening individual game pieces is considerably less if the game piece results are printed at the point of sale, since the results are not determined until a sale is made.

The gaming machines capable of locally printing results for pull-tab game pieces also benefit from their similarity to gaming machines used for traditional gambling purposes. However, pull-tab game pieces are legal in more jurisdictions.

Although on-demand printed pull-tab game pieces have many advantages over pre-printed pull-tab game pieces, impact printing of the game pieces poses problems that detract from the acceptance of the on-demand printed game pieces. In addition to forming an impression of the game results in the surface of the game pieces, which can detract from game play, impact printing is noisy, generates paper dust, and requires considerable maintenance. Costs associated with maintaining remote machines with impact printers can be prohibitively high.

SUMMARY OF INVENTION

Our invention, provides an improved construction for on-demand printed pull-tab game pieces for supporting the direct thermal printing of results hidden within the game pieces. The new construction is expected to lower cost and improve reliability of machines for dispensing on-demand printed pull-tab game pieces and to enhance play by keeping the results more securely hidden until the game pieces are opened.

An exemplary pull-tab game piece according to our invention includes a base substrate that is at least partially transparent. A thermosensitive imaging layer overlays a front surface of the base substrate, and an opaque coating covers the thermosensitive imaging layer. Bonded to a back surface of the base substrate is a cover substrate within which an at least partially removable tab is formed. Retracting the tab from the cover substrate exposes a view through the base substrate. The opaque coating on the front surface of the base substrate transmits concentrations of heat required to form thermal images in the thermosensitive imaging layer from a thermal print head. However, the opaque coating at least partly obscures a view of the thermal images formed in the thermosensitive imaging layer from the front side of the base layer. When the tab is retracted, the opaque coating visually contrasts with the thermal images formed in the thermosensitive imaging layer as a background against which the thermal images can be distinguished through the back face of the base layer.

The base substrate is preferably a transparent or translucent film. The opaque coating is preferably an ink, such as an ink priritable along an in-line press. The ink's color should differ from the color of thermal images formed in the thermosensitive imaging layer to provide the desired contrast. To further obscure the thermal images formed in the thermosensitive layer, additional coatings, preferably inks, can be applied over the opaque coating. For example, a confusion pattern having a color matching the color of the thermal images can be printed over the opaque coating.

The removable tab can be formed in a variety of ways. For example, the tab can be formed by a pattern of perforations in the cover substrate. An adhesive responsible for bonding the cover substrate to the base substrate can be patterned to avoid areas of overlap between the tab and the base substrate. Alternatively, the tab can be more completely cut out of the cover and held in place by a so-called fugitive adhesive (a dry release adhesive). Part of the cut-out tab is preferably permanently bonded to the base substrate or attached to the remaining cover substrate to avoid producing separate pieces of scrap following play.

Another exemplary pull-tab game piece according to our invention also includes a base substrate that is at least partially transparent. However, instead of supporting a thermosensitive imaging layer on the front surface of the base substrate, the thermosensitive imaging layer is supported on a back surface of a thermally transmissive substrate, which is bonded to the front face of the base substrate. The thermosensitive imaging layer is oriented adjacent to the front face of the base substrate. The thermally transmissive substrate is at least partially opaque or rendered opaque by the thermosensitive imaging layer itself or an additional coating applied to a front face of the thermally transmissive substrate. A retractable tab is mounted on the back face of the base substrate overlying a region of the thermosensitive imaging layer intended for direct thermal printing through the thermally transmissive substrate. Opaque regions of the thermally transmissive substrate and the retractable tab obscure views of the direct thermal printable region of the thermosensitive imaging layer from both sides of the base substrate.

Retracting the tab allows the printable region to be viewed through the base substrate. Similar to the opaque layer of the previous example, the thermally transmissive substrate together with any immediate coatings or colorings provides contrast for thermal images formed in the thermosensitive imaging layer by direct thermal printing. The thermally transmissive substrate can be made of transmissive materials such as thin paper or film, which are preferably made in a color that contrasts with the thermal images formed in the thermosensitive imaging layer. Coatings, including ink coatings, can be added to provide more color. A confusion pattern or other printing can be added in place of or in addition to the coatings to provide for further obscuring the thermal images viewed from the front face of the base substrate.

DRAWINGS

DETAILED DESCRIPTION

Pull-tab game pieces can be used for a variety of purposes including low-stakes wagering, fundraising, and advertising. Other purposes include use as an alternative to scratch-off latex games, which can be messy. Direct thermal printing of such game pieces at point of sale or distribution to determine winnings is expected to provide heightened security over game pieces with preprinted results while providing a construction that still allows for the deferred revelation of the results by removing or otherwise retracting a tab.

Figure 1:
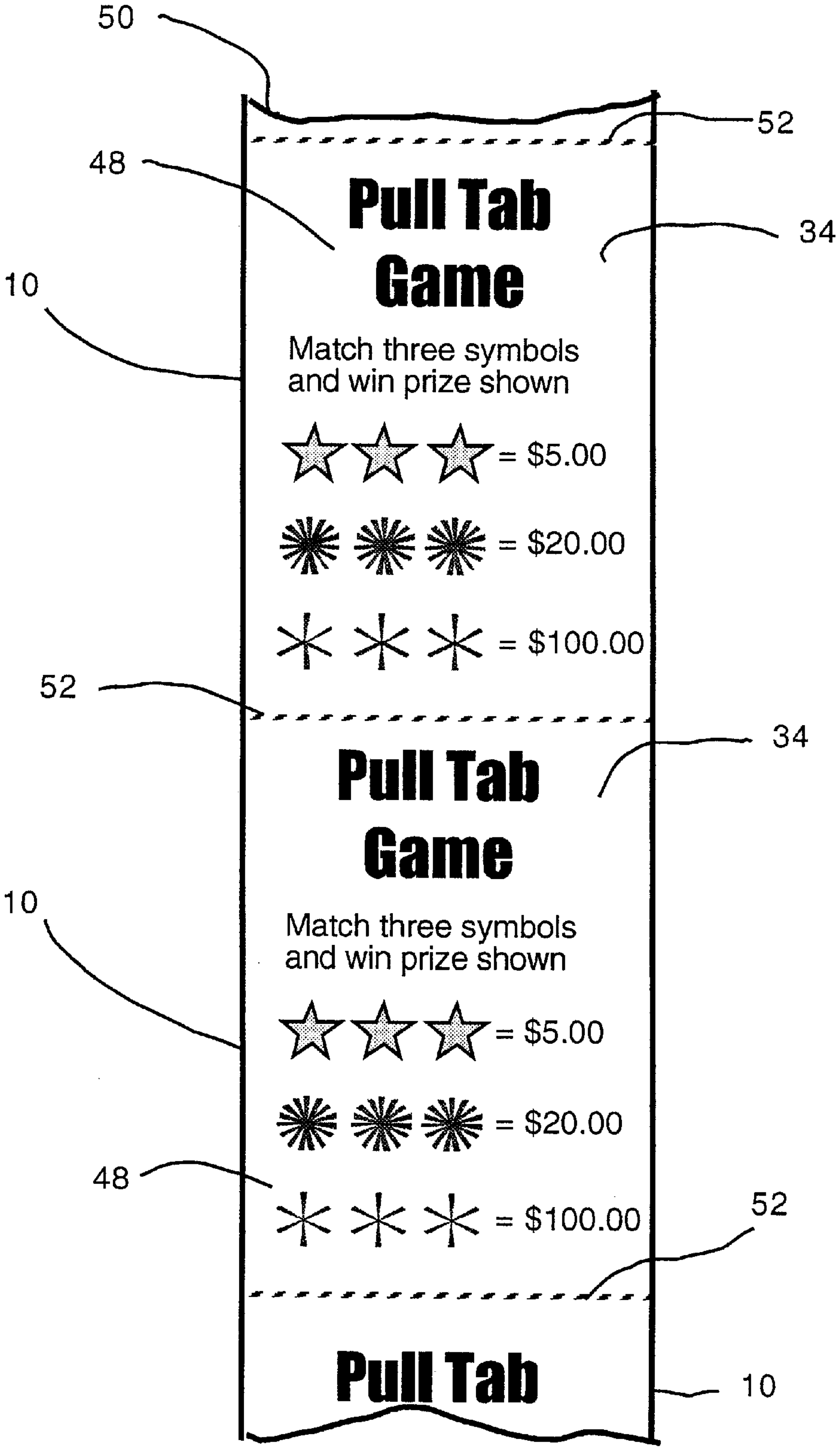
FIG. 1 is a broken-away front view of a succession of pull-tab game pieces.
Figure 2:
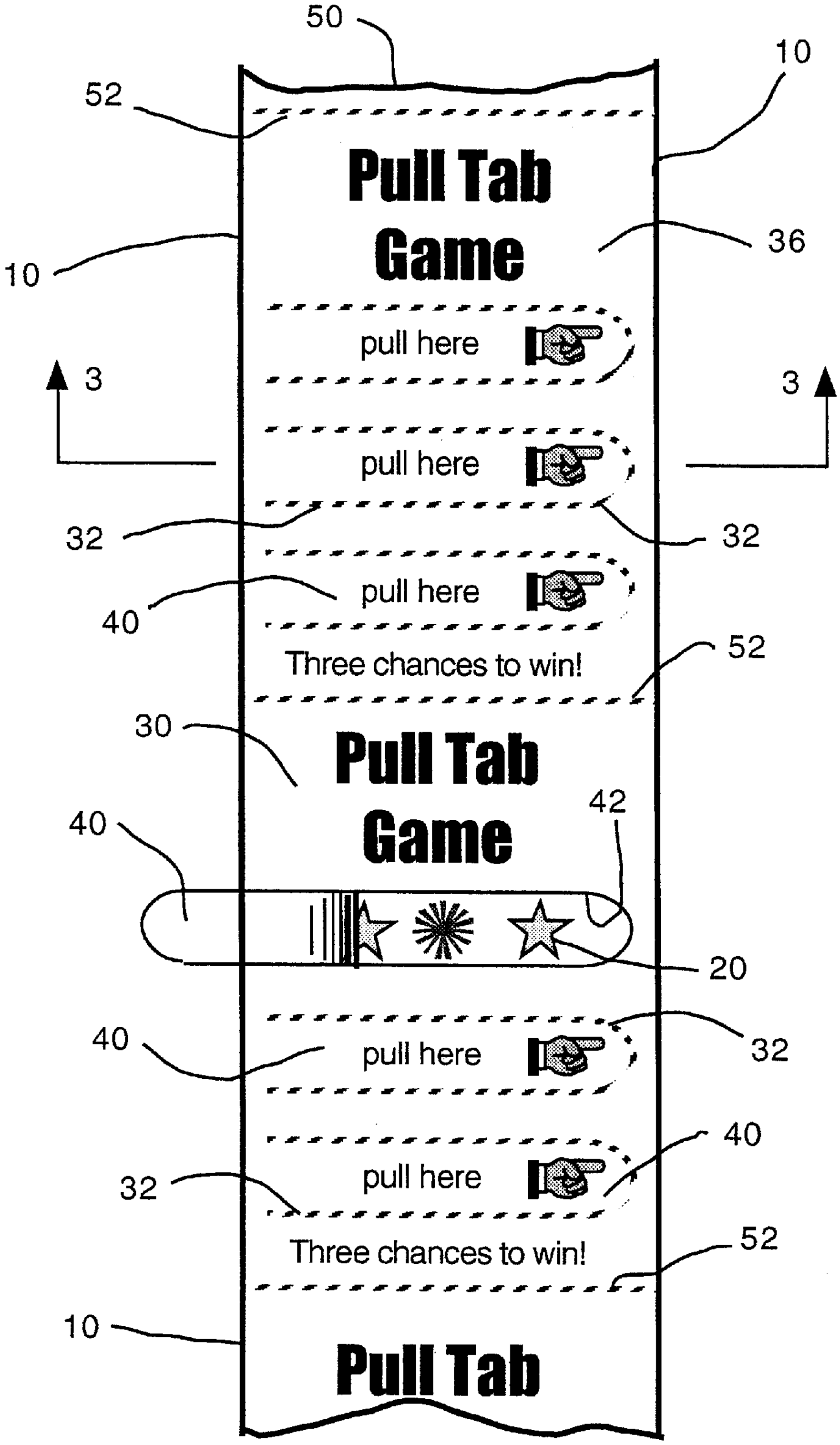
FIG. 2 is a broken-away back view of a succession of pull-tab game pieces.
Figure 3:
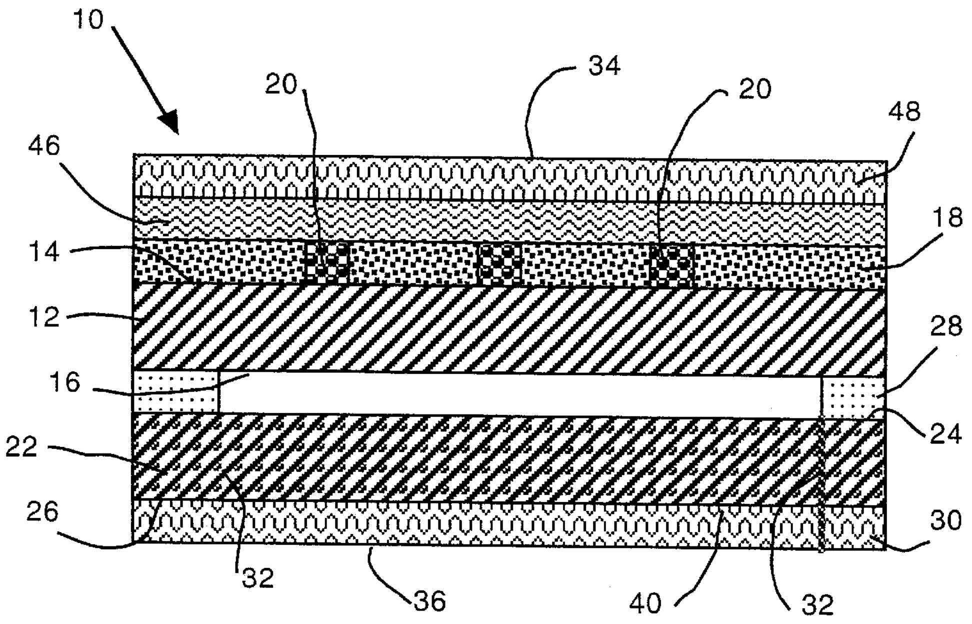
FIG. 3 is an exaggerated thickness cross-sectional view of one of the pull-tab game pieces taken along line 3—3 of FIG. 2.

A strip of exemplary pull-tab game pieces 10 arranged in accordance with these purposes is depicted in FIGS. 1–3. As shown particularly in FIG. 3, the pull-tab game pieces 10 are an assembly of two substrates, base substrate 12 and cover substrate 22. The base substrate 12 is an at least partially transparent (e.g., translucent) paper or film having a front surface 14 supporting a thermosensitive imaging layer 18. Thermal images 20 (e.g., game results) formed in the thermosensitive imaging layer 18 on the front surface 14 of the base substrate 12 are visible through a back surface 16 of the base substrate 12.

The base substrate 12 and thermosensitive imaging layer 18 are preferably acquired together as a direct thermal printable paper or film. One example is an 81 micron polypropylene film, product number C-100 from Kanzaki Specialty Papers of Ware, Mass., coated with an ultra-high sensitivity thermosensitive coating for reacting with heat to form black images. Direct thermal papers are available from Appleton Papers of Appleton, Wis.

The cover substrate 22, which can also be made of paper or film, has a front surface 24 that is partially bonded to the back surface 16 of the base substrate 12 with a patterned permanent adhesive 28. One or more layers of printing ink 30 are applied to a back surface 26 of the cover substrate 22, which are visible in FIG. 2 as printed images on a back surface 36 of the pull-tab game pieces 10. Either the cover substrate 22 or the layers of printing ink 30, and preferably both, are opaque to obscure any view of the thermal images 20 through the back surface 36 of the pull-tab game pieces 10.

Also shown in FIG. 2 as well as in FIG. 3 are patterns of perforations 32, which partially surround gaps in the patterned permanent adhesive 28. The patterns of perforations 32 are cut through both the layers of printing ink 30 and the cover substrate 22 to form retractable tabs 40 that can be pulled away or otherwise separated from the base substrate 12 forming window frames 42 within which the thermal images 20 can be viewed through the base substrate 12.

For example, one of the retractable tabs 40 is shown in a retracted position in FIG. 2, revealing thermal images 20 in the form of two different star burst patterns within one of the window frames 42 formed in a remaining bonded portion of the cover substrate 22. The window frames 42 limit the viewing area of the thermosensitive imaging layer 18 to the thermal images 20 immediately beneath the retractable tabs 40 that are pulled apart from the window frames 42.

To enhance the visibility of the thermal images 20 through the windows 42 while obscuring visibility of the same thermal images 20 from a front surface 34 of the pull-tab game pieces 10 (see FIG. 1), an opaque coating 46 (see FIG. 3) is applied over the thermosensitive imaging layer 18 on the front surface 14 of the base substrate 12. The opaque coating 46 is preferably a layer of printing ink in a color (e.g., white) that contrasts with the color (e.g., black) of the thermal images 20 to enhance visibility of the thermal images 20 through the back surface 16 of the translucent base substrate 12. However, the opaque coating 46 impairs transmissions of light to at least partially obscure view of the same thermal images 20 through the front surface 34 of the pull-tab game pieces 10. One such ink is an opaque UV white sold as product number UFA 90100 by Akzo Nobel of Plymouth, Minn. Other colors are also available.

One or more additional printing layers 48 can be applied over top of the opaque coating 46 to form printed images on the front surface 34 of pull-tab game pieces 10 or to further obscure the front-side view of the thermal images 20. The printed layers 48 can contain information for playing or promoting the game or patterns, such as confusion patterns for additionally obscuring the thermal images 20. However, the opaque coating 46 and printing layers 48 are sufficiently thermally transmissive (e.g., sufficiently thin) to enable the thermal images 20 to be printed by a conventional direct thermal printer through the front surface 34 of the pull-tab game pieces 10. The required thermal transmissivity requires heat conduction with a minimum of dispersion, which can be accomplished by material thinness or material compositions that preferentially conduct heat in the thickness dimension over other directions that would tend to blur the thermal images 20.

As shown in FIGS. 1 and 2, the pull-tab game pieces 10 are separated from one another along a continuous strip or web 50 by lines of perforation 52. The strip 50 of pull-tab game pieces 10 is preferably loaded into a direct thermal printer in a continuous form such as a roll or fan-folded stack. The direct thermal printing through the front surface 34 of the pull-tab game pieces 10 should be mirror reversed to permit the desired image to be viewed from the back surface 36 of the pull-tab game pieces 10.

Following the direct thermal printing of the thermal images 20 (e.g., game results), the individual pull-tab game pieces 10 are separated in groups of one or more along the lines of perforation 52. Alternatively, the pull-tab game pieces 10 can be pre-cut or otherwise separated in sheet form prior to being loaded into the direct thermal printer. The printer can also be assembled with a cutting mechanism as an alternative to use of perforations.

The first two drawing figures illustrate three retractable tabs 40 per game piece 10. However, the number of retractable tabs 40 per game piece 10 can vary considerably from one to six or more. The pattern of perforations 32 preferably leaves some portion of each of the retractable tabs 40 connected to the cover substrate 22 after retraction to reduce instances of scrap. The remaining portions of the retractable tabs 40 preferably remain bonded to the base substrate 12. Alternatively, the tabs 40 could be cut out along continuous rather than perforated lines and held in place with a fugitive adhesive. In addition, the cover substrate 22 could be formed as one or more retractable tabs 40 without the surrounding window frames 42, and a fugitive adhesive could be applied to hold them in place on the base substrate 12.

Figure 4:
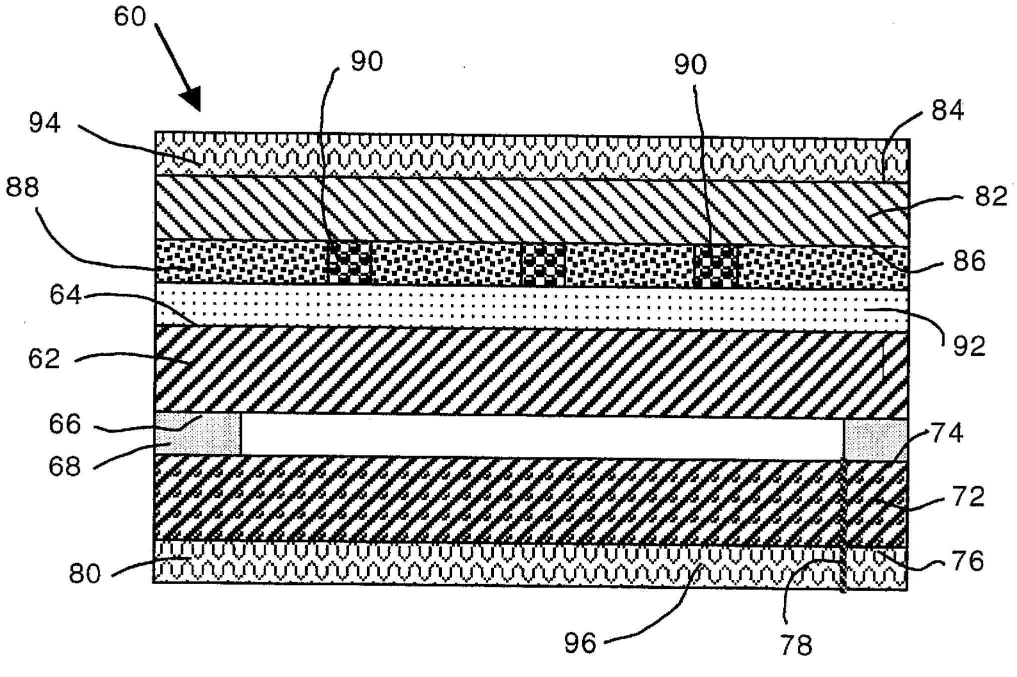
FIG. 4 is cross-sectional view similar to FIG. 3 of an alternative game piece.

Another exemplary pull-tab game piece 60 shown in FIG. 4 looks and functions similar to the pull-tab game pieces 10 but has a different cross-sectional configuration. The assembly requires three substrates: a base substrate 62, a cover substrate 72, and a thermally transmissive substrate 82. Like the preceding embodiment, the base substrate 62 is an at least partially transparent (e.g., translucent) paper or film.

Also similar to the preceding embodiment, a front surface 74 of the cover substrate 72 is bonded by a patterned adhesive layer 68 to a back surface 66 of the base substrate 62. One or more layers of printing ink 80 cover the back surface 76 of the cover substrate 72. Preferably, both the cover substrate 72 and the printed ink layers 80 are opaque. A pattern of perforations 78 formed through the printed layers 80 and the cover substrate 72 form retractable tabs 96 similar to the preceding embodiment.

A back surface 86 of the thermally transmissive substrate 82 supports a thermosensitive imaging layer 88 within which thermal images 90 (e.g., game results) are formed. A permanent adhesive layer 92 bonds the thermally transmissive substrate 82 to a front surface 64 of the base substrate 62. Preferably, the thermally transmissive substrate 82 is opaque in a color that contrasts with a color of the thermal images 90. One or more layers of printing ink 94 cover the front surface 84 of the thermally transmissive substrate 82 to further obscure the thermal images 90. Among the layers of printing ink 94 can be a confusion pattern as well as information associated with the play or promotion of the pull-tab game piece 60.

The thermally transmissive substrate 82 can be a paper or film, but must be sufficiently thermally transmissive (e.g., having a thickness around 10 microns or less) to support the direct thermal printing of the thermal images 90 in the thermosensitive layer 88 through its front surface 84. The direct thermal printing is preferably accomplished by conventional direct thermal printers that are widely available with standardized units of heat output power. Examples of direct thermal printable films laminated to underlying substrates are described in U.S. Pat. No. 6,124,236, entitled Direct Thermal Printable Film and Laminate, to one of the joint inventors herein, which is hereby incorporated by reference. Thin paper, such as paper referred to as "bible paper", can also be used as the thermally transmissive substrate 82. A thin direct thermal paper is available from Appleton Papers Inc. of Appleton, Wisconsin, under the trade name OPTIMA POS Plus thermal paper and having a target thickness of 0.002 inches or 50 microns. Any thermal insulating layer between the paper substrate and the thermosensitive imaging layer is preferably removed or replaced by a more thermally conductive layer.

The retractable tabs 96 can be pulled apart from remaining portions of the cover substrate 72 along the lines of perforation 78 to reveal the thermal images 90 through the translucent base substrate 62. The thermally transmissive substrate 82 through which the images 90 are printed preferably provides both contrast for enhancing the view of the images 90 through the base substrate 62 and opacity for obscuring the view of the images 90 through the thermally transmissive substrate 82.

Instead of supporting the thermosensitive imaging layer 88 on the back surface 86 of the thermally transmissive substrate 82, the thermosensitive imaging layer 88 could be supported on the front surface 64 of the base substrate 62 similar to the preceding embodiment. However, transmissions of heat from direct thermal printing would be required to conduct through both the thermally transmissive substrate 82 and the adhesive layer 92 that permanently bonds the thermally transmissive substrate 82 to the base substrate 62.

Adhesive materials or films that favor the conduction of heat along one orthogonal axis (i.e., an axis corresponding to a thickness dimension) over the remaining two orthogonal axes could be used (for either or both of the adhesive layer 92 and thermally transmissive substrate 82) to maintain concentrated transmissions of heat through larger distances. Such materials or arrangements of materials that exhibit uniaxial anisotropic electrically conductive properties having metal particle or fiber alignments are also likely candidates for supporting similar anisotropic thermally conductive properties. Thermagon, Inc. of Cleveland, Ohio, produces a range of thermally conductive dielectric polymers, including T-gon 300 and 400 series paste adhesives, that could be printed (e.g., screen printed) in a dot matrix form to favor heat transfers between adjacent layers with a minimum of lateral thermal diffusion.

The thermal coupling materials or material arrangements exhibiting uniaxial anisotropic thermal conductivity have widespread relevance to imaging thermosensitive materials through overlying layers and larger distances from thermal print heads. Such materials in the form of adhesives can provide for bonding protective layers (e.g., paper or film substrates) over otherwise supported thermosensitive imaging layers. In other forms, such as coatings, the materials themselves can provide protection and other overlying functions. For example, in accordance with the illustrated embodiments, the thermal coupling layer is preferably opaque to obscure the image formed in the thermosensitive layer until the pull tab is retracted.

Although the pull tab game pieces 10 and 60 and their various substrates are referenced with respect to front and back surfaces, the labels of "front" and "back" are used for convenience of reference only and can be altogether exchanged with one another without any structural implications.

The new pull-tab game pieces 10 and 60 can be manufactured along in-line presses for performing sequential operations involving printing, coating, die cutting, laminating, and rolling or stacking. The printing operations for repeating patterns are preferably performed using flexographic printing processes. Digital printing is preferred for printing security codes or other variable information.

We claim:

1. A pull-tab game piece comprising:

a base substrate that is at least partially transparent and has front and back surfaces;

a thermosensitive imaging layer on the front surface of the base substrate;

an at least partially opaque layer covering the thermosensitive imaging layer on the front face of the base substrate;

a cover substrate partially bonded to the back surface of the base substrate;

a tab formed in the cover substrate that is at least partially removable for exposing a view through the base substrate; and the opaque layer providing for:

(a) transmitting concentrations of heat required to form thermal images in the thermosensitive imaging layer from a thermal print head;

(b) at least partly obscuring a view of the thermal images formed in the thermosensitive imaging layer from the front side of the base layer; and (c) visually contrasting with the thermal images formed in the thermosensitive imaging layer as a background against which the thermal images can be distinguished through the back face of the base layer.

2. The game piece of claim 1 in which the opaque layer is an opaque coating having a color that differs from a color of the thermal images formed in the thermosensitive imaging layer.

3. The game piece of claim 2 further comprising a confusion pattern formed over the opaque coating.

4. The game piece of claim 3 in which the confusion pattern has a color that does not contrast with the color of the thermal images formed in the thermosensitive imaging layer.

5. The game piece of claim 1 in which the opaque layer a thermally transmissive substrate.

6. The game piece of claim 1 in which the tab is formed by a pattern of perforations in the cover substrate.

7. The game piece of claim 1 in which the tab is cut out of the cover substrate and is held in place against the base substrate by a fugitive adhesive.

8. The game piece of claim 7 in which a portion of the tab remains connected to a remaining portion of the cover substrate.

9. The game piece of claim 7 in which a portion of the tab is permanently bonded to the base substrate.

10. The game piece of claim 1 in which the base substrate is a translucent film.

11. The game piece of claim 1 in which the opaque layer favors transmissions of heat in a direction for producing the thermal images in the thermosensitive imaging layer over other directions that disperse the heat and blur the thermal images.

12. A direct thermal printable pull tab comprising:

a direct thermal printable film having front and back surfaces;

a thermosensitive imaging layer of the direct thermal printable film being located on the front surface of the direct thermal printable film;

the direct thermal printable film being at least partially transparent for viewing thermal images formed in the thermosensitive imaging layer through the back surface of the direct thermal printable film;

an at least partially removable tab mounted on the back surface of the direct thermal printable film overlapping with a printable area of the thermosensitive imaging area;

an opaque coating on the front surface of the direct thermal printable film covering at least a portion of the printable area of the direct thermal printable film overlapping with the at least partially removable tab; and the at least partially removable tab and the opaque coating providing for obscuring views of thermal images formed in the thermosensitive imaging layer by direct thermal printing through the opaque layer.

13. The pull tab of claim 12 in which the at least partially removable tab includes a first portion that is tacked to the direct thermal printable film and a second portion that is permanently bonded to the direct thermal printable film.

14. The pull tab of claim 12 in which the at least partially, removable tab is formed in a cover substrate that is permanently bonded to the direct thermal printable film.

15. The pull tab of claim 12 in which the opaque coating has a color that contrasts with a color of the thermal images formed in the thermosensitive imaging layer.

16. The pull tab of claim 15 further comprising a confusion pattern formed over the opaque coating.

17. The pull tab of claim 16 in which the confusion pattern has a color that does not contrast with the color of the thermal images formed in the thermosensitive imaging layer.

18. The pull tab of claim 12 in which the opaque coating is an ink.

19. A pull-tab game piece comprising:

an at least partially transparent base substrate having front and back surfaces;

a thermally transmissive substrate having front and back surfaces;

a thermosensitive imaging layer supported on the back surface of the thermally transmissive substrate;

the back surface of the thermally transmissive substrate being bonded to the front surface of the at least partially transparent base substrate;

a tab mounted on the back surface of the at least partially transparent base substrate overlapping a region of the thermosensitive imaging layer where thermal images can be formed through the thermally transmissive substrate by direct thermal printing; and the tab being retractable for viewing the thermal images through the at least partially transparent base substrate.

20. The game piece of claim 19 in which the thermally transmissive substrate provides contrast for viewing the thermal images through the at least partially transparent base substrate.

21. The game piece of claim 19 in which the thermally transmissive substrate is opaque.

22. The game piece of claim 19 further comprising an opaque layer on the front surface of the thermally transmissive substrate for obscuring view of the thermal images through the thermally transmissive substrate.

23. The game piece of claim 22 in which the opaque layer has a color that contrasts with a color of the thermal images.

24. The game piece of claim 19 further comprising a pattern printed on the front surface of the thermally transmissive substrate for obscuring view of the thermal images through the thermally transmissive substrate.

25. The game piece of claim 24 in which the printed pattern includes a color that matches the color of the thermal images to further obscure view of the thermal images.

26. The game piece of claim 19 in which the thermally transmissive substrate exhibits anisotropic thermal conductivity for favoring transmissions of heat in a direction for producing the thermal images in the thermosensitive imaging layer.

27. A direct thermal printable pull tab comprising:

a base substrate that is at least partially transparent and has front and back surfaces;

a thermosensitive imaging layer on the front surface of the base substrate;

a thermally transmissive substrate having front and back surfaces;

an adhesive layer located between the back surface of the thermally transmissive substrate and the thermosensitive imaging layer for bonding the thermally transmissive substrate to the base substrate;

a tab mounted on the back surface of the base substrate overlapping a region of the thermosensitive imaging layer where thermal images can be formed through the thermally transmissive substrate by direct thermal printing; and the tab being retractable for viewing the thermal images through the at least partially transparent base substrate.

28. The pull tab of claim 27 in which the thermally transmissive substrate is opaque.

29. The pull tab of claim 28 in which the thermally transmissive substrate has a color that contrasts with a color of the thermal images.

30. The pull tab of claim 27 further comprising an opaque layer on the front surface of the thermally transmissive substrate for obscuring view of the thermal images through the thermally transmissive substrate.

31. The pull tab of claim 27 in which the adhesive layer exhibits anisotropic thermal conductivity for favoring transmissions of heat in a direction for producing the thermal images in the thermosensitive imaging layer.

32. The pull tab of claim 27 in which the thermally transmissive substrate exhibits anisotropic thermal conductivity for favoring transmissions of heat in a direction for producing the thermal images in the thermosensitive imaging layer.

33. A method of making a direct thermal printable pull tab comprising the steps of:

laminating a cover substrate on one side of an at least partially transparent base substrate;

overlying an opposite side of the base substrate with a thermally transmissive opaque layer;

locating a thermosensitive imaging layer between the thermally transmissive opaque layer and the base substrate; and arranging the cover substrate to include tabs that can be retracted to view thermal images that are direct thermally printed in the thermosensitive imaging layer through the base substrate.

34. The method of claim 33 in which the thermally transmissive opaque layer has a color that contrasts with a color of the thermal images in the thermosensitive imaging layer.

35. The method of claim 34 in which the thermally transmissive opaque layer is an opaque coating.

36. The method of claim 34 in which the thermally transmissive opaque layer is an opaque substrate.

37. The method of claim 36 in which the thermally sensitive imaging layer is supported on the opaque substrate.

38. The method of claim 33 in which the thermally sensitive imaging layer is supported on the base substrate.

* * * * *